(12) United States Patent
Palazzo (10) Patent No.: US 7,548,877 B2
(45) Date of Patent: Jun. 16, 2009

(54) SYSTEM AND METHOD FOR PROCESSING ORDERS FOR MULTIPLE MULTILEVEL MARKETING BUSINESS MODELS

(75) Inventor: Craig M. Palazzo, Grand Rapids, MI (US)

(73) Assignee: Quixtar, Inc., Ada, MI (US)

( * ) Notice: Subject to any disclaimer, the term of this patent is extended or adjusted under 35 U.S.C. 154(b) by 870 days.

(21) Appl. No.: 10/929,529

(22) Filed: Aug. 30, 2004

(65) Prior Publication Data

US 2006/0047575 A1 Mar. 2, 2006

(51) Int. Cl.
*G06Q 30/00* (2006.01)
*G06Q 50/00* (2006.01)

(52) U.S. Cl. ....................................... 705/26
(58) Field of Classification Search ........... 705/26, 705/28, 30, 1
See application file for complete search history.

(56) References Cited

U.S. PATENT DOCUMENTS

| | | | |
|---|---|---|---|
| 5,319,542 A | 6/1994 | King, Jr. et al. | |
| 5,694,551 A * | 12/1997 | Doyle et al. | 705/26 |
| 5,893,076 A | 4/1999 | Hafner et al. | |
| 5,953,707 A | 9/1999 | Huang et al. | |
| 5,970,472 A | 10/1999 | Allsop et al. | |
| 6,249,772 B1 | 6/2001 | Walker et al. | |
| 6,263,317 B1 * | 7/2001 | Sharp et al. | 705/26 |
| 6,587,827 B1 | 7/2003 | Hennig et al. | |
| 6,980,962 B1 * | 12/2005 | Arganbright et al. | 705/26 |
| 2002/0002513 A1 | 1/2002 | Chiasson | |
| 2002/0010615 A1 * | 1/2002 | Jacobs | 705/9 |
| 2002/0099631 A1 | 7/2002 | Vanker et al. | |
| 2002/0103690 A1 | 8/2002 | Lyon et al. | |
| 2002/0107747 A1 | 8/2002 | Gerogianni | |
| 2002/0161674 A1 | 10/2002 | Scheer | |
| 2002/0178028 A1 | 11/2002 | King | |
| 2002/0188449 A1 | 12/2002 | Nukaga et al. | |
| 2003/0018502 A1 * | 1/2003 | Rodriguez | 705/7 |
| 2003/0036977 A1 * | 2/2003 | Morse | 705/27 |
| 2003/0105722 A1 | 6/2003 | Welt | |
| 2003/0130900 A1 | 7/2003 | Telford et al. | |
| 2003/0156185 A1 | 8/2003 | Katz | |
| 2003/0163346 A1 | 8/2003 | Tinti et al. | |

(Continued)

OTHER PUBLICATIONS

"Europe's largest network marketing company now has the world's best bonuses," M2 Presswire, Dec. 24, 2003.*

*Primary Examiner*—Matthew S Gart
*Assistant Examiner*—Scott A Zare
(74) *Attorney, Agent, or Firm*—Brinks Hofer Gilson & Lione (57) ABSTRACT

A system for processing orders for multiple multilevel marketing business models comprises a user interface, a product order processing server, a first suborder processing server, and a second suborder processing server. A user inputs at least one main order at a user interface. The main order is sent to the product order processing unit where the main order is parsed into a first suborder comprising a first product type and a second suborder comprising a second product type. The product order processing unit then routes the first suborder to the first suborder processing unit to process the first suborder according to a first multilevel marking business model. Additionally, the product order processing unit routes the second suborder to the second suborder processing unit to process the second suborder according to a second multilevel marketing business model, wherein the first and second multilevel marketing business models are different.

13 Claims, 5 Drawing Sheets

U.S. PATENT DOCUMENTS

2003/0184588 A1    10/2003  Lee
2004/0010442 A1*    1/2004  Merker et al. .................. 705/10
2005/0075955 A1*    4/2005  Milovina-Meyer et al. .... 705/30
2005/0144082 A1*    6/2005  Coolman et al. ............... 705/26
2005/0209965 A1*    9/2005  Ganesan ....................... 705/40

* cited by examiner

Figure 1

Item Count: 7

| General | Payment | | |
|---|---|---|---|

General

Order Date: 7/26/2004 8:38:39 AM

IBO Order#: QINV07260400044

Ordering IBO#: 00001586384    Name Verify: PAL

Volume IBO#: 00001586384    Name Verify: PAL

Ship To

IMC#: 00003327400    Name: Thompson, Connie    Name Verify: THO

Address Line 1: 412 Burton SE

Address Line 2:

City: Grand Rapids    State: MI    Postal Code: 49507

Email: craig.palazzo@quixtar.com    Phone: (616) 247-0746

Delivery Options
- ● Standard (Cycle)
- ○ Ground (Express)
- ○ Premium

Get Valid Delivery Options

| Qty | Sku | Clr/Size | UOM | Desc | PV | BV | IBO Cost | Sugg Retail | Actual Price | Sub Total |
|---|---|---|---|---|---|---|---|---|---|---|
| 1 | 100048 | | E | FB-T/A MR CHOC/COCO | 7.80 | 20.90 | $18.05 | $21.95 | $18.05 | $18.05 |
| 1 | 100049 | | E | TOLSOM SKIN PROTEC | 10.95 | 30.00 | $25.75 | $33.75 | $25.75 | $25.75 |
| 1 | 100022 | | C | HOLIDAY BODY SOUL | 15.35 | 42.00 | $35.00 | $47.25 | $35.00 | $35.00 |
| 1 | 100048 | | C | FB-T/A MR CHOC/COCO | 46.80 | 125.40 | $105.00 | $131.70 | $105.00 | $105.00 |
| 1 | 100070 | | C | NFS-CHOLESTEROL HE | 43.40 | 119.20 | $99.60 | $144.60 | $99.60 | $99.60 |
| 1 | 100020 | | C | GEL MAGNA BLOC BAC | 52.65 | 143.55 | $119.65 | $155.60 | $119.65 | $119.65 |
| 1 | 100049 | | C | TOLSOM SKIN PROTEC | 65.70 | 180.00 | $150.00 | $202.50 | $150.00 | $150.00 |
| 1 | | | | | 0.00 | 0.00 | $0.00 | $0.00 | $0.00 | $0.00 |
| | | | | | 242.65 | 661.05 | $553.05 | $737.35 | | Total: $553.05 |

Consolidate Order    Import and Consolidate Order    Send to Outbox    Preview    Save    Create Template    Close

SYSTEM AND METHOD FOR PROCESSING ORDERS FOR MULTIPLE MULTILEVEL MARKETING BUSINESS MODELS

BACKGROUND

A multilevel marketing business model is a business in which individuals who are independent representatives of a product company market and sell a company's products, and sponsor new independent representatives to do the same. Typically, to provide an incentive to market and sell the company's product, the company will pay performance bonuses to the independent representatives based on their sales volume and the sales volume of those they have sponsored.

Traditionally, companies implementing multilevel marketing businesses models have generally used two types of business models. The variations in the multilevel marking business models are often based on how product orders are placed and fulfilled.

In a traditional multilevel marketing business model, independent representatives are known as distributions. Distributors may purchase the company's products for themselves, for those distributors they have sponsored, and for sale to retail customers. There are typically two types of distributors. A direct distributor is authorized to purchase products directly from the product company where a non-direct distributor must order their products and receive fulfillment of their orders through a sponsoring distributor. The sponsoring distributor similarly must place their orders, including orders of their sponsored distributors, with their sponsoring distributors, and so on, known as the upline, until the order reaches a direct distributor who places their order directly with the product company. Normally, fulfillment of product orders occurs in the opposite direction through the chain of distributors, known as the downline.

At each distributor level, the distributor receives orders for products from their downline, combines these orders with their own orders for personal consumption and for sale to their retail customers, and places this combined order with their sponsoring distributor or directly with the company, as in the case of a direct distributor.

Typically, each product sold by a multilevel marketing company is assigned an incentive value. The incentive value is used to help determine performance bonuses paid to the distributors. Often, the incentive value attempts to balance the profit earned by the company on the sale of the product against the amount of incentive required for a distributor to sell a particular product. Further, incentive values are often assigned on a product by product basis and their value has no basis on the overall value of a given transaction, i.e. the individual incentive value assigned to a product does not change based on the quantity of the product purchased or the combination of products purchased. Additionally, there is no predefined mathematical relationship between the incentive value and the price of the product. For example, a $10 bottle of vitamins may have different incentive value than a $10 water filter due to the characteristics of the products, such as their manufacturing cost or market penetration.

When a distributor places their order with their sponsoring distributor, or with the company, the incentive value for each product in the order is added to that distributor's periodic accumulated incentive value. The accumulated incentive value is used to determine the performance bonus owed to that distributor.

In an internet-based multilevel marketing business model, the business model is similar to the traditional multilevel marketing business model except that all distributors, often referred to as independent business owners ("IBO's"), are eligible to purchase products directly from the product company using an internet web site. Product orders are then fulfilled directly to the ordering IBO. Under the internet-based multilevel marketing business model, the incentive value of each product is earned in the same manner as in the traditional multilevel marketing business model described above wherein the IBO earns the incentive value associated with products purchased by themselves and their sponsored IBO's. Further, performance bonuses are computed and paid in the same manner as the traditional multilevel marketing business model.

In both the traditional and internet-based multilevel marketing business model, IBO's or distributors may earn a performance bonus based on the sales of products to themselves and to their sponsored participants, i.e. their downline. The sale of these products may be for personal consumption, further downline distribution, or retail sale. Normally, the amount of the performance bonus is based on the accumulated incentive value for all products purchased by that IBO/distributor over the course of a pre-defined period, typically a month. For every purchase made by the IBO/distributor or his downline, the assigned incentive value for purchased products is separately accumulated. At the end of the accumulation period, e.g. at the end of the month, the accumulated amount of incentive value is referenced against a look-up table to determine the amount that will be paid as cash value to the IBO/distributor and his downline as a performance bonus. Once the performance bonus is paid, the accumulated point total is reset to zero for the next accumulation period.

In addition to performance bonuses, a product company typically pays sales commissions to distributors or IBO's for purchases made at retail prices by their downline or retail customers. For direct sales made by a distributor in the traditional multilevel business marketing method known as "Standard Fulfillment", the retail commission is essentially the profit margin between the selling price and the price at which the distributor purchased the products, wherein the distributor simply retains this profit for themselves. According to the "Direct Fulfillment" multilevel marketing method, for sales made via a web site to clients at retail prices, the profit margin is similarly measured but accounted and paid by the company to the referring IBO.

Currently, there is no single order processing system which can route orders to be processed through both the traditional and the internet-based multilevel marketing business model depending on the type of product being purchased. For example, if single a multilevel marketing organization allows individuals to sell products according to both the traditional multilevel marketing business model and the internet-based multilevel marketing business model, that multilevel marketing company must be able to accept and fulfill two separate types of orders. A first order contains a set of products handled through the traditional multilevel marketing business model and a second order contains a set of products handled through the internet-based multilevel marketing business model. In addition, the multilevel marketing company must be able to track incentives and pay performance for distributors selling within both the traditional and the internet-based multilevel marketing systems. Hence, a company implementing both traditional and internet-based multilevel marketing models is forced to maintain two order systems. Further, the individuals are required to parse out their orders, i.e. identify which products can be ordered from which system.

Therefore, It would be desirable to have an order processing system that integrates the traditional and internet-based multilevel marketing business models wherein an individual who is both a distributor and an IBO can place a single order with all of their desired products and have the processing system parse, route, and process the order through either the traditional or internet-based multilevel marketing business model.

DETAILED DESCRIPTION OF THE DRAWINGS AND THE PRESENTLY PREFERRED EMBODIMENTS

Figure 1:
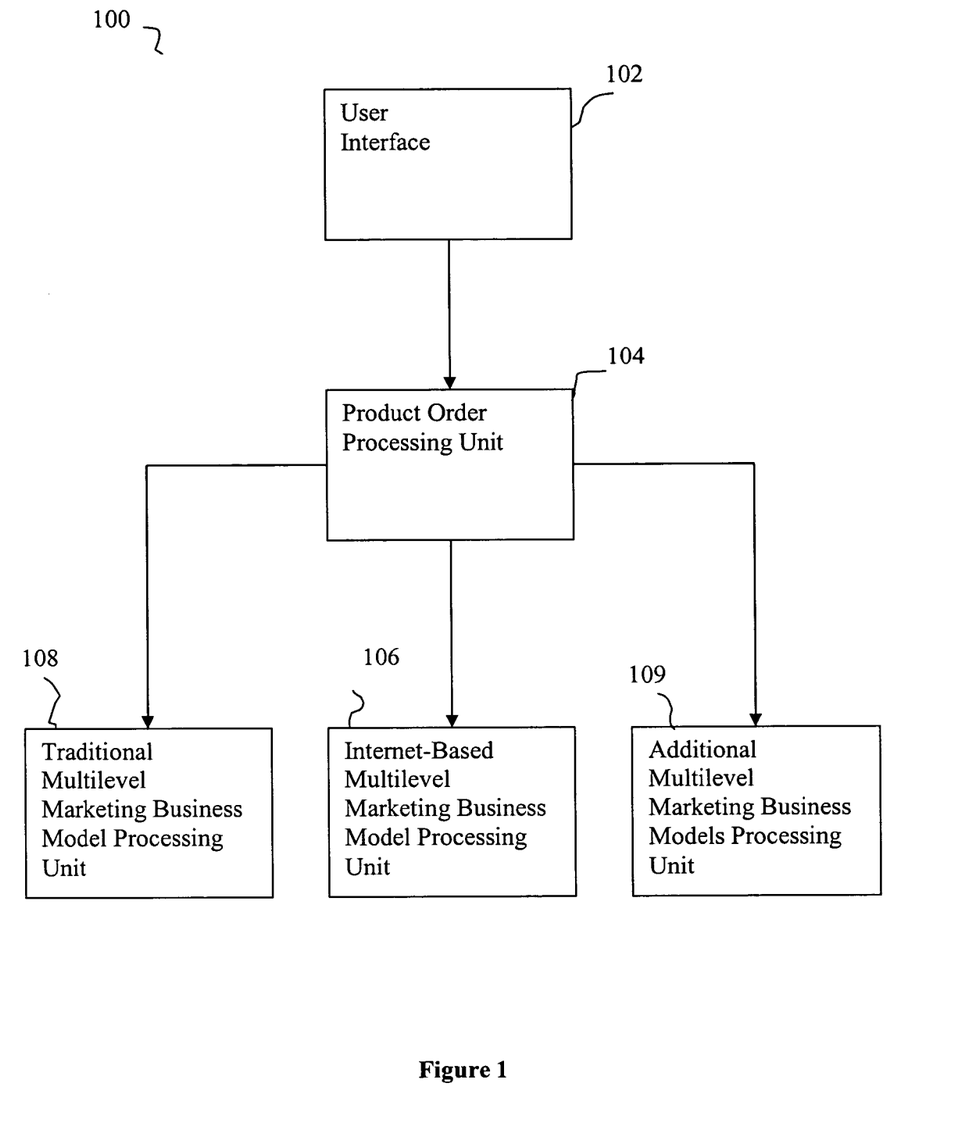
FIG. 1 is a block diagram of one embodiment of an Order Processing System according to one embodiment.

FIG. 1 shows an order processing system 100 according to one embodiment which includes a user interface 102, a product order processing unit 104 coupled with the user interface 102, an internet-based multilevel marketing business model processing unit 106 ("internet-based processing unit") coupled with the product order processing unit 104; and a traditional multilevel marketing business model processing unit 108 ("traditional processing unit") coupled with the product order processing unit 104. In alternative embodiments, it may be possible to couple additional multilevel marketing business model processing units 109 to the product order processing unit 104. Herein, the phrase "coupled with" is defined to mean directly connected to or indirectly connected through one, or more intermediate components. Such intermediate components may include both hardware and software based components. To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Generally, a user inputs a main order for various types of products at the user interface 102. The main order is sent to the product order processing unit 104 who receives the main order and examines a product database to determine a classification for each product in the main order. Depending on the classification of products and the classification of the user placing the main order, the product order processing unit 104 parses the main order into suborders and routes the suborders to lower-level processing units, such as the internet-based processing unit 106 and the traditional processing unit 108. The internet-based processing unit 106 accepts the suborder from the product order processing unit and processes the suborder according to the internet-based multilevel marketing business model. The traditional processing unit 108 accepts the order and processes the suborder according to the traditional multilevel marketing business model.

Figure 2:
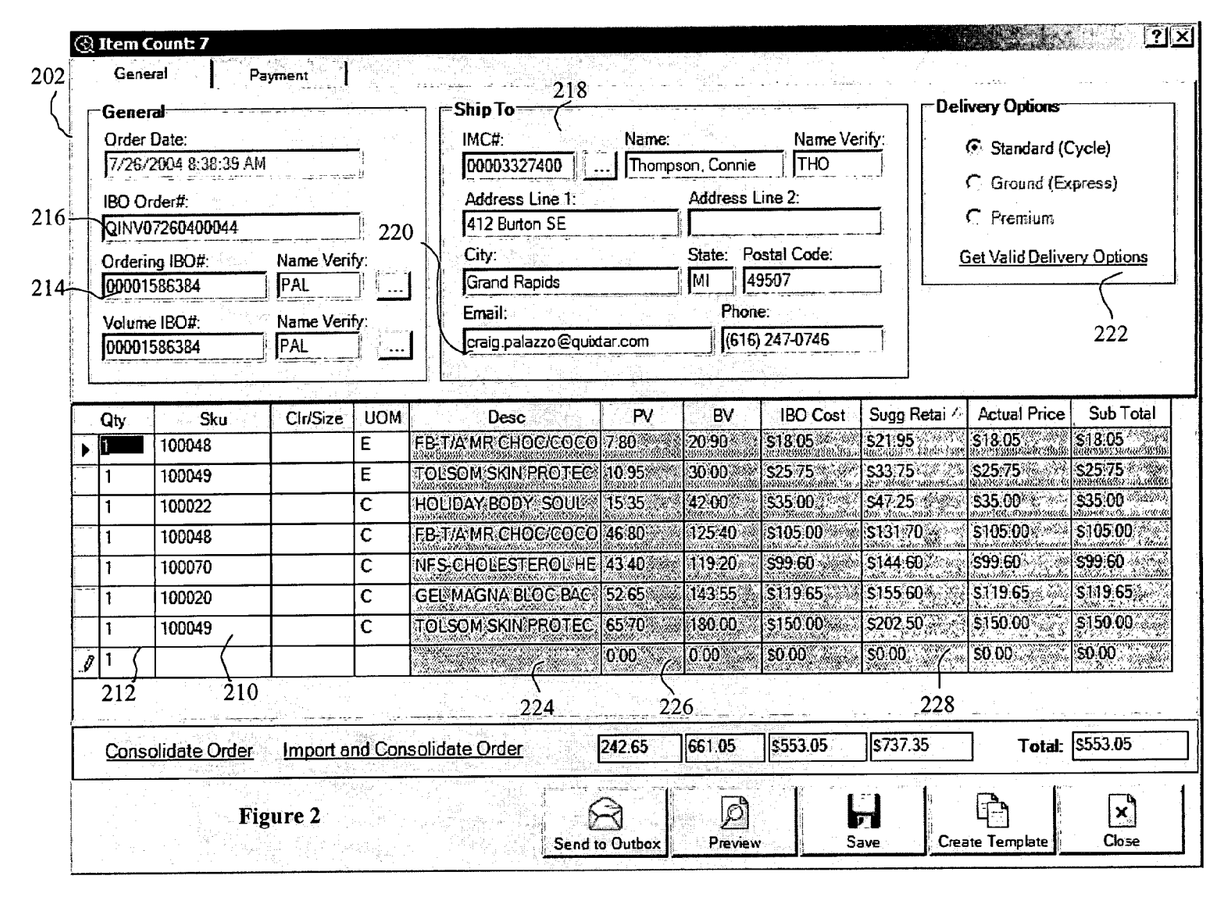
FIG. 2 is a screen shot of a user interface for use with the system of FIG. 1.

At the user interface 102, a user typically creates at least one main order file comprising various types of products available through both the traditional and internet-based multilevel marketing models. As shown in FIG. 2, the user interface 202 may be any type of spreadsheet or graphical user interface ("GUI") where a user can input at least a product identifier 210 (Stock Keeping Unit ("SKU") Number), a quantity for each product identifier 212, and an IBO identification 214. A main order may also contain information such as an order number 216, a shipping address 218, a delivery email address 220, delivery options 222, product descriptions 224, incentive values 226 associated with a product, or pricing information 228 associated with a product. A user may create a main order file comprising any type of product regardless of whether the user is a direct distributor, non-direct distributor, or IBO in a traditional or internet-based multilevel marketing business model.

Referring again to FIG. 1, in one embodiment, the user interface 102 may be a GUI implemented as one or more World Wide Web pages using dynamic or static Hypertext Markup Language ("HTML"), Extensible Markup Language ("XML"), Application Server Pages, or combinations thereof as are known.

In another embodiment, the user interface 102 may be a stand-alone computer, such as an Intel-based computer. Using the stand-alone computer, the user may create a main order in a spreadsheet using software such as Microsoft Access while the stand-alone computer is not connected to a network, such as the internet. The user may then connect the stand-alone computer to the product order processing unit 104 via a hard-wire connection or a network connection to send the main order file to the product order processing unit 104.

In one embodiment, the user may connect the stand-alone computer to the internet through an Internet Service Provider ("ISP") and transfer a main order file to the order processing unit 104 using Hypertext Transfer Protocol ("HTTP"), Simple Object Access Protocol ("SOAP"), File Transfer Protocol ("FTP"), or any other means known in the art. In another embodiment, the user may connect the stand-alone computer to the product order processing unit 104 through a direct dialup connection to send the main order file.

The product order processing unit 104 may be any type of hardware or software operable to accept the main order from the user interface 102, access a product database containing a classification of each product within the main order, access a user database containing a classification for the user placing the main order, parse the main order into suborders according to product classification and user classification, and route the suborders to lower level processing units, such as the internet-based and traditional processing units 106, 108.

In one embodiment, the product order processing unit 104 may be an Intel-based server such as a Microsoft Structured Query Language ("SQL") Server. Typically, the Microsoft SQL Server comprises a hard drive, a memory, a network interface, and at least one processor running at least one program written in Visual Basic .NET to perform the functions of the product order processing unit 104. Additionally, the Microsoft SQL Server is typically able to access product and user DB2 databases. DB2 is a family of relational database management system products from IBM. Typically, the DB2 databases may be run on any enterprise or personal Intel-based computer comprising a hard drive, a memory, a network interface, and at least one processor running Microsoft Windows 2000 or greater, as is known in the art.

Figure 3:
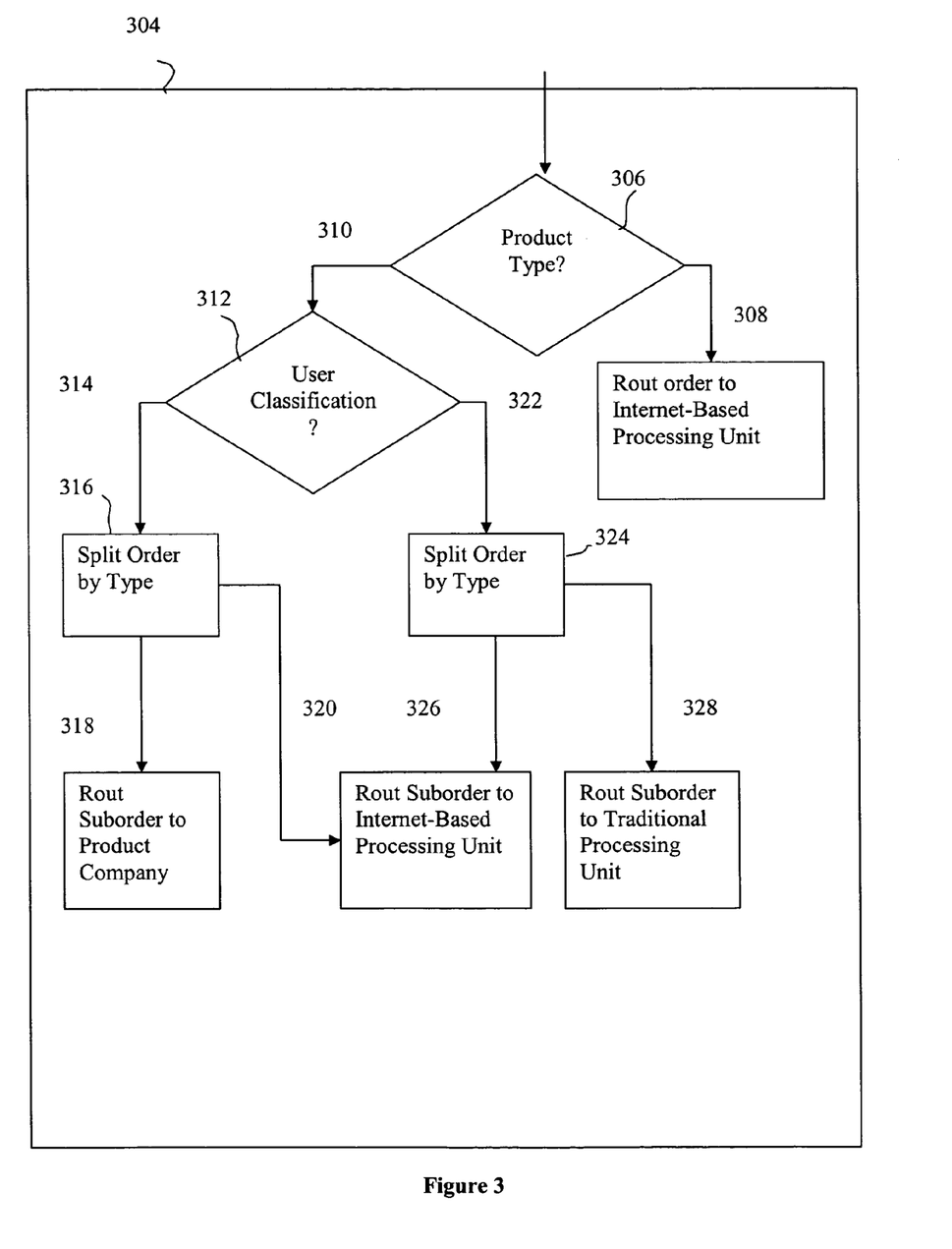
FIG. 3 is a flow diagram of a product order processing unit according to one embodiment.

As shown in FIG. 3, the product order processing unit 304 typically receives the main order file from the user interface 102 (FIG. 1) through a network interface. In response to receiving the main order file, at least one program, stored in a memory of the product order processing unit 304 and running on a processor of the order processing unit 304, accesses a product database containing a classification of each product within the main order. The at least one program running on a processor of the product order processing unit 304 determines the classification for each product within the main order. If the product order processing unit 304 determines that the main order file only contains products available through the internet-based multilevel marketing business 308, also known as non-coreline products, at least one program running on a processor of the processing unit 304 routes the order to the internet-based processing unit 106 (FIG. 1).

Figure 4:
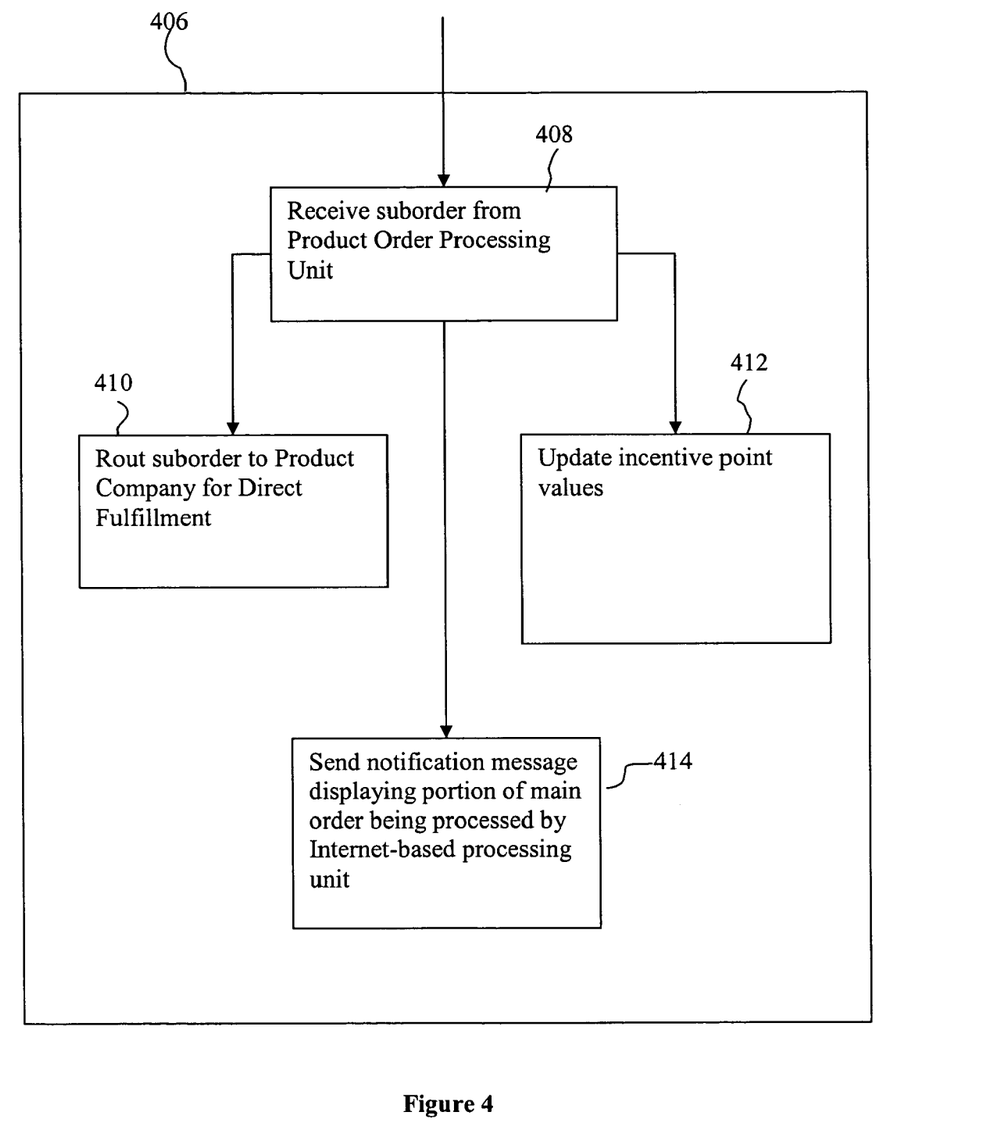
FIG. 4 is a flow diagram of an internet-based multilevel marketing business model processing unit ("internet-based processing unit") according to one embodiment.

In one embodiment, at least one program running on a processor of the product order processing unit 304 converts the main order file created by the user in programs such as Microsoft Access into an Extensible Markup Langue ("XML") file before sending the order of non-coreline products to the internet-based processing unit 406. In alternative embodiments, any other file type other than XML known in the art could be used.

Referring to FIG. 4, the internet-based processing unit 406 may be any type of hardware or software operable to accept the non-coreline order 408 from the product order processing unit 104 (FIG. 1) through a network interface and process the non-coreline order according to the internet-based multilevel marketing business model. In one embodiment, the internet-based processing unit 406 may be an IBM AS/400 server comprising a hard drive, a memory, a network interface, and at least one processor, but any type of hardware or software known in the art could be used.

The internet-based processing unit 406 may receive the non-coreline order 408 from the product order processing unit 104 (FIG. 1) through the use of HTTP, SOAP, FTP, a direct dialup connection, or any other means known in the art. Typically, at least one program, stored in a memory of the internet-based processing unit 406 and running on a processor of the internet-based processing unit 406, routes the non-coreline order to the appropriate product company 410 for direct fulfillment. Additionally, at least one program running on a processor of the internet-based processing unit 406 may update any incentive point totals 412 stored in a database associated with the user or any sponsor of the user.

Further, as part of processing the non-coreline order, at least one program running on a processor of the internet-based processing unit 406 may send a notification message 414, such as an email, to the user and sponsor of the user, displaying the portion of the main order being processed through the internet-based processing unit 406. This email may or may not be sent in real time as the non-coreline order is processed.

Referring again to FIG. 3, if after accessing the product order database, at least one program running on a processor of the product order processing unit 304 determines that the main order contains products available through a traditional multilevel marketing business 310, also known as coreline items, at least one program running on a processor of the product order processing unit 304 determines whether the user placing the order is a direct distributor or a non-direct distributor 312. A direct distributor, also known as a warehouse authorized user, is typically entitled to buy any coreline product directly from a product company. A non-direct distributor, also known as a non-warehouse authorized user, is typically not entitled to buy coreline products directly from a product company.

If the user is a direct distributor 314, at least one program running on a processor of the product order processing unit 304 parses any portion of the main order comprising coreline products into a first suborder and parses any portion of the main order comprising non-coreline products into a second suborder 316. In one embodiment, the first and second suborder may be XML files, but any file type known in the art could be used.

According to one example, the user is a direct distributor. Accordingly, at least one program running on a processor of the product order processing unit 304 routes the first suborder of coreline products to the product company for shipment directly from the product company to the user (318). Additionally, at least one program running on a processor of the product order processing unit 304 routes the second suborder to the internet-based processing unit 106 (FIG. 1) for direct fulfillment 320 as described above. In embodiments containing additional types of lower-level processing units other than the traditional and internet-based processing units 106, 108 (FIG. 1), the main order can be parsed into third, fourth, or more suborders.

If the user is a non-direct distributor 322, at least one program running on a processor in the product order processing unit 304 parses the main order into a first suborder comprising coreline products and a second suborder comprising non-coreline products 324. At least one program running on the processor of the product order processing unit 304 then routes each suborder to the appropriate lower-level processing unit. In the embodiment of FIG. 3, the product order processing unit 304 routes the second suborder 326 to the internet-based processing unit 106 (FIG. 1) for direct fulfillment as described above. Additionally, the product order processing unit 304 routes the first suborder 328 to the traditional processing unit 108 (FIG. 1) for processing.

Figure 5:
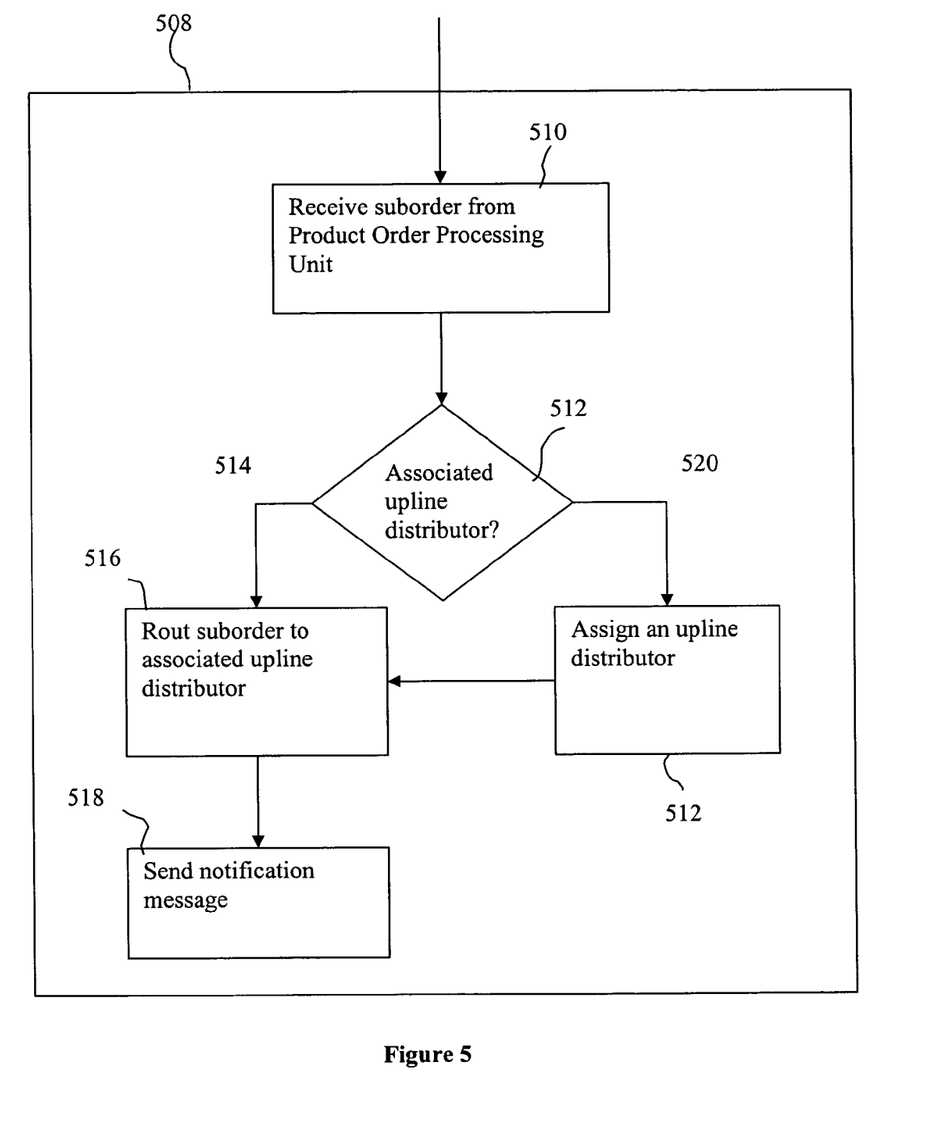
FIG. 5 is a flow diagram of a traditional multilevel marketing business model processing unit ("traditional processing unit") according to one embodiment.

Referring to FIG. 5, the traditional processing unit 508 may be any type of hardware or software operable to accept the coreline order from the product order processing unit 104 (FIG. 1) through a network interface and process the coreline order according to the traditional multilevel marketing business model. The traditional processing unit 508 may receive the suborder from the product order processing unit 104 (FIG. 1) through the use of HTTP, SOAP, FTP, a direct dialup connection, or any other means known in the art. In one embodiment, the traditional processing unit 508 may be an IBM AS/400 server comprising a hard drive, a memory, a network interface, and at least one processor, but any type of hardware or software known in the art could be used.

Typically, after receiving the suborder 510, at least one program, stored in a memory of the traditional processing unit 508 and running on a processor of the traditional processing unit 508, searches a user database or some other type of record for an upline distributor associated with the user who placed the main order 512. If an associated distributor is found 514, a least one program running on a processor of the traditional processing unit 508 routes the suborder to the associated distributor to order the products for the user 516. As part of processing the suborder, at least one program running on a processor of the traditional processing unit 508 may send a notification message 518, such as an email, to the user to notify the user that a portion of their main order was a coreline product and could not be directly fulfilled. The notification message may also indicate that the portion of main order comprising coreline products was forwarded to an associated distributor for processing.

If at least one program running on the processor of the traditional processing unit 108 does not find an associated distributor, the traditional processing unit 108 may assign an associated distributor 522 based on geographic location or any other factor desired by the company. At least one program running on a processor of the traditional processing unit 108 then routes the suborder to the associated distributor to order the products for the user 516.

It is therefore intended that the foregoing detailed description be regarded as illustrative rather than limiting, and that it be understood that it is the following claims, including all equivalents, that are intended to define the spirit and scope of this invention.

The invention claimed is:

1. A method for processing an order comprising:
    inputting at least one main order comprising at least one of a first product type, a second product type, or combinations thereof, into a user interface;
    storing each of the at least one main order as a main order file;
    sending each of the at least one main order file to a product processing unit;
    accessing a product database to determine a product type of each of the at least one product comprising each of the at least one main order file, wherein the product type identifies an association between a product and a type of multilevel marketing business model;
    accessing a user database to determine a user classification for a user placing the main order, wherein the user classification identifies a classification of a user with respect to one or more multilevel marketing business models;
    parsing each of the at least one main order file into a first suborder and a second suborder based at least in part on the user classification of the user placing the order and the product types of the first and second products;
    storing each of the first suborder as a first suborder file;
    storing each of the second suborder as a second suborder file;
    sending the each of the first suborder files to a first product type processing unit
    to fulfill each of the first suborders;
    processing each of the first suborders according to a first multilevel marketing business model;
    sending each of the second suborder files to a second product type processing unit to fulfill each of the second suborders; and
    processing each of the second suborders according to a second multilevel marketing business model, wherein the first and second multilevel marketing business models are different.

2. The method of claim 1, further comprising:
    connecting the user interface to the product processing unit using Hypertext Transfer Protocol.

3. The method of claim 1, further comprising:
    connecting the user interface to the product processing unit using Simple Object Access Protocol.

4. The method of claim 1, further comprising:
    connecting the user interface to the product processing unit using File Transfer Protocol.

5. The method of claim 1, further comprising:
    connecting the user interface to the product processing unit through a direct dialup connection.

6. The method of claim 1, further comprising:
    notifying a user of the contents of each of the first suborders and the second suborders.

7. An order processing system comprising:
    an order processing unit server configured to receive a main order from a user interface, the main order comprising at least one product of a first product type, a second type, or combination thereof, access a product database to determine a product classification of each of the at least one product comprising the main order, access a user database to determine a user classification of the user, and parse the main order into at least a first suborder and a second suborder based at least in part on the user classification the user placing the order and the product types of the first and second products;
    a first product type processing unit server configured to receive the first suborder from the order processing unit server and fulfill the first suborder according to a first multilevel marketing business model; and
    a second product type processing unit server configured to receive the second suborder from the order processing unit server and fulfill the second suborder according to a second multilevel marketing business model;
    wherein the first and second multilevel marketing business models are different;
    wherein the product type identifies an association between a product and a type of multilevel marketing business model; and
    wherein the user classification identifies a classification of a user with respect to one or more multilevel marketing business models.

8. The order processing system of claim 7, wherein:
    the order processing unit server receives the main order from the user interface using Hypertext Transfer Protocol.

9. The order processing system of claim 7, wherein:
    the order processing unit server receives the main order from the user interface using Simple Object Access Protocol.

10. The order processing system of claim 7, wherein:
    the order processing unit server receives the main order from the user using File Transfer Protocol.

11. The order processing system of claim 7, wherein:
    the order processing unit server receives the main order from the user interface through a direct dialup connection.

12. The order processing system of claim 7, wherein:
    the first multilevel marketing business model is a traditional multilevel marketing business model.

13. The order processing system of claim 7, wherein:
    the second multilevel marketing business model is an internet-based multilevel marketing business model.

* * * * *

UNITED STATES PATENT AND TRADEMARK OFFICE
CERTIFICATE OF CORRECTION

PATENT NO. : 7,548,877 B2  Page 1 of 1
APPLICATION NO. : 10/929529
DATED : June 16, 2009
INVENTOR(S) : Craig M. Palazzo It is certified that error appears in the above-identified patent and that said Letters Patent is hereby corrected as shown below:

<u>On the Title Page</u>

Item (73), replace "Quixtar, Inc." with --Amway Corp.--.

Item (57), line 4, under "ABSTRACT", after "A user inputs at" replace "last" with --least--.

Item (57), line 11, under "ABSTRACT", after "first multilevel" replace "marking" with --marketing--.

Signed and Sealed this

Twentieth Day of October, 2009

David J. Kappos
*Director of the United States Patent and Trademark Office*